United States Patent
Holtcamp et al.

(10) Patent No.: US 12,344,686 B2
(45) Date of Patent: Jul. 1, 2025

(54) BROAD ORTHOGONAL DISTRIBUTION POLYETHYLENES FOR FILMS

(71) Applicant: ExxonMobil Chemical Patents Inc., Baytown, TX (US)

(72) Inventors: Matthew W. Holtcamp, Huffman, TX (US); Matthew S. Bedoya, Humble, TX (US); Timothy M. Boller, Houston, TX (US); Hasnain Rangwalla, Katy, TX (US); David F. Sanders, Beaumont, TX (US); Ching-Tai Lue, Sugar Land, TX (US); Dongming Li, Houston, TX (US); Adriana S. Silva, Houston, TX (US); Ru Xie, Baytown, TX (US); Joseph A. Moebus, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 614 days.

(21) Appl. No.: 17/756,997

(22) PCT Filed: Nov. 18, 2020

(86) PCT No.: PCT/US2020/060992
§ 371 (c)(1),
(2) Date: Jun. 7, 2022

(87) PCT Pub. No.: WO2021/126448
PCT Pub. Date: Jun. 24, 2021

(65) Prior Publication Data
US 2023/0022904 A1    Jan. 26, 2023

Related U.S. Application Data

(60) Provisional application No. 62/949,241, filed on Dec. 17, 2019.

(51) Int. Cl.
*C08F 210/16* (2006.01)
*C08F 4/659* (2006.01)
*C08F 4/6592* (2006.01)

(52) U.S. Cl.
CPC ............ *C08F 210/16* (2013.01); *C08F 4/659* (2013.01); *C08F 4/65927* (2013.01); *C08F 2420/12* (2021.01)

(58) Field of Classification Search
CPC .... C08F 210/16; C08F 4/659; C08F 4/65927; C08F 2500/12
See application file for complete search history.

(56) References Cited

U.S. PATENT DOCUMENTS

| | | |
|---|---|---|
| 6,242,545 B1 | 6/2001 | Jejelowo et al. |
| 6,248,845 B1 | 6/2001 | Loveday et al. |

(Continued)

FOREIGN PATENT DOCUMENTS

| | | |
|---|---|---|
| EP | 2931763 B1 | 1/2018 |
| WO | 2019083609 A1 † | 5/2019 |
| WO | 2019-0108327 | 6/2019 |

*Primary Examiner* — Rip A Lee

(57) ABSTRACT

A polyethylene comprising of ethylene derived units and 0.5 wt % to 10 wt % $C_3$ to $C_{12}$ α-olefin derived units may be synthesized using a mixed catalyst that comprises rac-dimethylsilylbis(tetrahydroindenyl)zirconium dichloride and a zirconium co-catalyst in a mole ratio of 50:50 to 90:10, and wherein the zirconium co-catalyst is a poor comonomer incorporator as compared to the rac-dimethylsilylbis(tetrahydroindenyl)zirconium dichloride catalyst. Such a polyethylene may have a density of 0.91 $g/cm^3$ to 0.93 $g/cm^3$, an $I_2$ value of 0.5 g/10 min to 2 g/10 min, an $I_{21}$ value of 25 g/10 min to 75 g/10 min, an $I_{21}/I_2$ ratio of 25 to 75, a molar reversed-co-monomer index (RCI,m) of 30 to 180, a phase angle equal or lower than 70° at complex modulus G* of (Continued)

10,000 Pa, a $\Theta_2$ of 1.5 radians to −1.5 radians, and a low density population of 50% and 70% by weight of the polyethylene.

10 Claims, 3 Drawing Sheets

(56) References Cited

U.S. PATENT DOCUMENTS

| | | | |
|---|---|---|---|
| 6,528,597 B2 | 3/2003 | Loveday et al. | |
| 6,828,394 B2 | 12/2004 | Vaughan et al. | |
| 6,936,675 B2 | 8/2005 | Szul et al. | |
| 6,956,088 B2 | 10/2005 | Farley et al. | |
| 7,119,153 B2 | 10/2006 | Jensen et al. | |
| 7,172,816 B2 | 2/2007 | Szul et al. | |
| 7,179,876 B2 | 2/2007 | Szul et al. | |
| 7,381,783 B2 | 6/2008 | Loveday et al. | |
| 7,547,754 B2 | 6/2009 | McDaniel et al. | |
| 7,572,875 B2 | 8/2009 | Jensen et al. | |
| 7,625,982 B2 | 12/2009 | Martin et al. | |
| 8,247,065 B2 | 8/2012 | Best et al. | |
| 8,378,043 B2 | 2/2013 | Graham et al. | |
| 8,383,754 B2 | 2/2013 | Yang et al. | |
| 8,476,392 B2 | 7/2013 | Kolb et al. | |
| 8,691,715 B2 | 4/2014 | Yang et al. | |
| 8,722,567 B2 | 5/2014 | Slawiniski | |
| 8,846,841 B2 | 9/2014 | Yang et al. | |
| 8,940,842 B2 | 1/2015 | Yang et al. | |
| 9,006,367 B2 | 4/2015 | McDaniel et al. | |
| 9,079,991 B2 * | 7/2015 | Ker | C08F 210/16 |
| 9,096,745 B2 | 8/2015 | Lam et al. | |
| 9,115,229 B2 | 8/2015 | Slawiniski | |
| 9,181,369 B2 | 11/2015 | Tso et al. | |
| 9,181,370 B2 | 11/2015 | Sukhadia et al. | |
| 9,217,049 B2 | 12/2015 | Yang et al. | |
| 9,290,593 B2 | 3/2016 | Cho et al. | |
| 9,334,350 B2 | 5/2016 | McDaniel et al. | |
| 9,447,265 B2 | 9/2016 | Lam et al. | |
| 9,850,332 B2 | 12/2017 | Lue et al. | |
| 9,975,974 B2 | 5/2018 | Mariott et al. | |
| 10,155,830 B2 | 12/2018 | Kim et al. | |
| 10,266,626 B2 | 4/2019 | Sung et al. | |
| 10,344,102 B2 | 7/2019 | Kim et al. | |
| 10,494,462 B2 | 12/2019 | Kuhlman | |
| 10,570,532 B2 | 2/2020 | Bae et al. | |
| 10,723,819 B2 | 7/2020 | Holtcamp et al. | |
| 10,808,053 B2 * | 10/2020 | Li | C08F 2/44 |
| 10,927,203 B2 | 2/2021 | Lue | C08F 210/16 |
| 11,046,796 B2 * | 6/2021 | Li | C08J 5/18 |
| 11,274,196 B2 * | 3/2022 | Li | C08F 4/65925 |
| 11,302,459 B2 * | 4/2022 | Doufas | B29C 48/06 |
| 2004/0225088 A1 † | 11/2004 | Vaughan | |
| 2009/0156764 A1 | 6/2009 | Malakoff et al. | |
| 2010/0121006 A1 | 5/2010 | Cho et al. | |
| 2015/0291748 A1 | 10/2015 | Malakoff | |
| 2016/0333124 A1 † | 11/2016 | Sung | |
| 2016/0347889 A1 | 12/2016 | Lue et al. | |
| 2018/0134828 A1 * | 5/2018 | Doufas | C08F 210/16 |
| 2018/0237554 A1 * | 8/2018 | Holtcamp | C08F 4/65927 |
| 2019/0040168 A1 * | 2/2019 | Holtcamp | C08F 210/16 |
| 2019/0119413 A1 * | 4/2019 | Holtcamp | C08F 210/16 |
| 2019/0256696 A1 | 8/2019 | Chandak et al. | |
| 2019/0389988 A1 | 12/2019 | Ye et al. | |
| 2020/0231790 A1 * | 7/2020 | Li | C08F 210/16 |
| 2021/0023540 A1 * | 1/2021 | Holtcamp | C08F 210/14 |

\* cited by examiner

† cited by third party

US 12,344,686 B2

BROAD ORTHOGONAL DISTRIBUTION POLYETHYLENES FOR FILMS

CROSS-REFERENCE OF RELATED APPLICATIONS

This application is a National Phase Application claiming priority to PCT Application Serial No. PCT/US2020/060992, filed Nov. 18, 2020, which claims the benefit U.S. Provisional Application 62/949,241, filed Dec. 17, 2019, entitled "Broad Orthogonal Distribution Polyethylenes for Films", the entireties of which are incorporated by reference herein.

FIELD

The present disclosure relates to polyethylene useful for films.

BACKGROUND

A trade-off exists among various performance attributes that has been a major hurdle in the development of new polyethylene product technologies. Among such performance attributes are a combination of stiffness, toughness, processability, and optical properties, all of which are important for most of linear low density polyethylene (LLDPE) film applications. However, it is difficult to achieve all of these attributes in one composition because improving toughness often reduces processability and increases stiffness that may cause optical properties to suffer.

SUMMARY OF THE INVENTION

The present disclosure relates to polyethylene useful for films and in particular to films made from polyethylene that has a broad orthogonal composition (or comonomer) distribution (BOCD).

A nonlimiting example embodiment of the present disclosure is a method comprising: reacting ethylene, a $C_3$ to $C_{12}$ α-olefin comonomer, and hydrogen in the presence of a mixed catalyst to form a polyethylene, wherein the polyethylene comprises: ethylene derived units and $C_3$ to $C_{12}$ α-olefin derived units at 0.5 wt % to 10 wt % of the polyethylene; wherein the polyethylene has: a density of 0.91 g/cm³ to 0.93 g/cm³, an $I_2$ value within a range from 0.5 g/10 min to 2 g/10 min, an $I_{21}$ value within a range from 25 g/10 min to 75 g/10 min, an $I_{21}/I_2$ ratio of 25 to 75, a molar reversed-co-monomer index (RCI,m) of 30 to 180, a phase angle equal or lower than 70° at complex modulus G* of 10,000 Pa, a $\theta_2$ within a range from 1.5 radians to −1.5 radians, and a low density population within a range from 50% and 70% by weight of the polyethylene; and wherein the mixed catalyst comprises rac-dimethylsilylbis(tetrahydroindenyl)zirconium dichloride (Compound I) and a zirconium co-catalyst (Compound II) in a Compound I to Compound II mole ratio of 50:50 to 90:10, and wherein the zirconium co-catalyst is a poor comonomer incorporator as compared to the rac-dimethylsilylbis(tetrahydroindenyl)zirconium dichloride catalyst. The reaction conditions can include one or more of the following: wherein a reaction temperature is 66° C. (150° F.) to 93° C. (200° F.); wherein a reactor pressure is 200 psig to 400 psig; wherein mole % ratio of comonomer to ethylene in a reactor is 0.005 to 0.030; and wherein a mole % ratio of hydrogen to ethylene in a reactor is 3.0 to 5.5.

Another nonlimiting example embodiment is a film comprising: polyethylene comprising ethylene derived units and $C_3$ to $C_{12}$ α-olefin derived units at 0.5 wt % to 10 wt % of the polyethylene; and having: a density of 0.91 g/cm³ to 0.93 g/cm³, an $I_2$ value within a range from 0.5 g/10 min to 2 g/10 min, an $I_{21}$ value within a range from 25 g/10 min to 75 g/10 min, an $I_{21}/I_2$ ratio of 25 to 75, a molar reversed-co-monomer index (RCI,m) of 30 to 180, a phase angle equal or lower than 70° at complex modulus G* of 10,000 Pa, a $\theta_2$ within a range from 1.5 radians to −1.5 radians, and a low density population within a range from 50% and 70% by weight of the polyethylene; wherein the film has a 1% Secant flexure modulus in a machine direction (MD) of 25,000 psi to 45,000 psi, an Elmendorf tear in the MD of 200 g to 350 g, and a Dart Drop value of 200 g/mil to 1,000 g/mil. The film may also have one or more of the following properties: wherein the film has a tensile yield strength in the MD of 1,000 psi to 2,000 psi; wherein the film has a 1% Secant flexure modulus in the TD of 30,000 psi to 60,000 psi; wherein the film has a tensile yield strength in the TD of 1,000 psi to 2,500 psi; wherein the film has an elongation at yield in the MD of 5% to 12%; wherein the film has a tensile strength in the MD of 5,000 psi to 10,000 psi; and wherein the film has an elongation at break in the MD of 400% to 550%.

Yet another nonlimiting example of the present disclosure is a composition comprising: polyethylene comprising ethylene derived units and $C_3$ to $C_{12}$ α-olefin derived units at 0.5 wt % to 10 wt % of the polyethylene; and having a density of 0.91 g/cm³ to 0.93 g/cm³, an $I_2$ value within a range from 0.5 g/10 min to 2 g/10 min, an $I_{21}$ value within a range from 25 g/10 min to 75 g/10 min, an $I_{21}/I_2$ ratio of 25 to 75, a molar reversed-co-monomer index (RCI,m) of 30 to 180, a phase angle equal or lower than 70° at complex modulus G* of 10,000 Pa, a $\theta_2$ within a range from 1.5 radians to −1.5 radians, and a low density population within a range from 50% and 70% by weight of the polyethylene.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
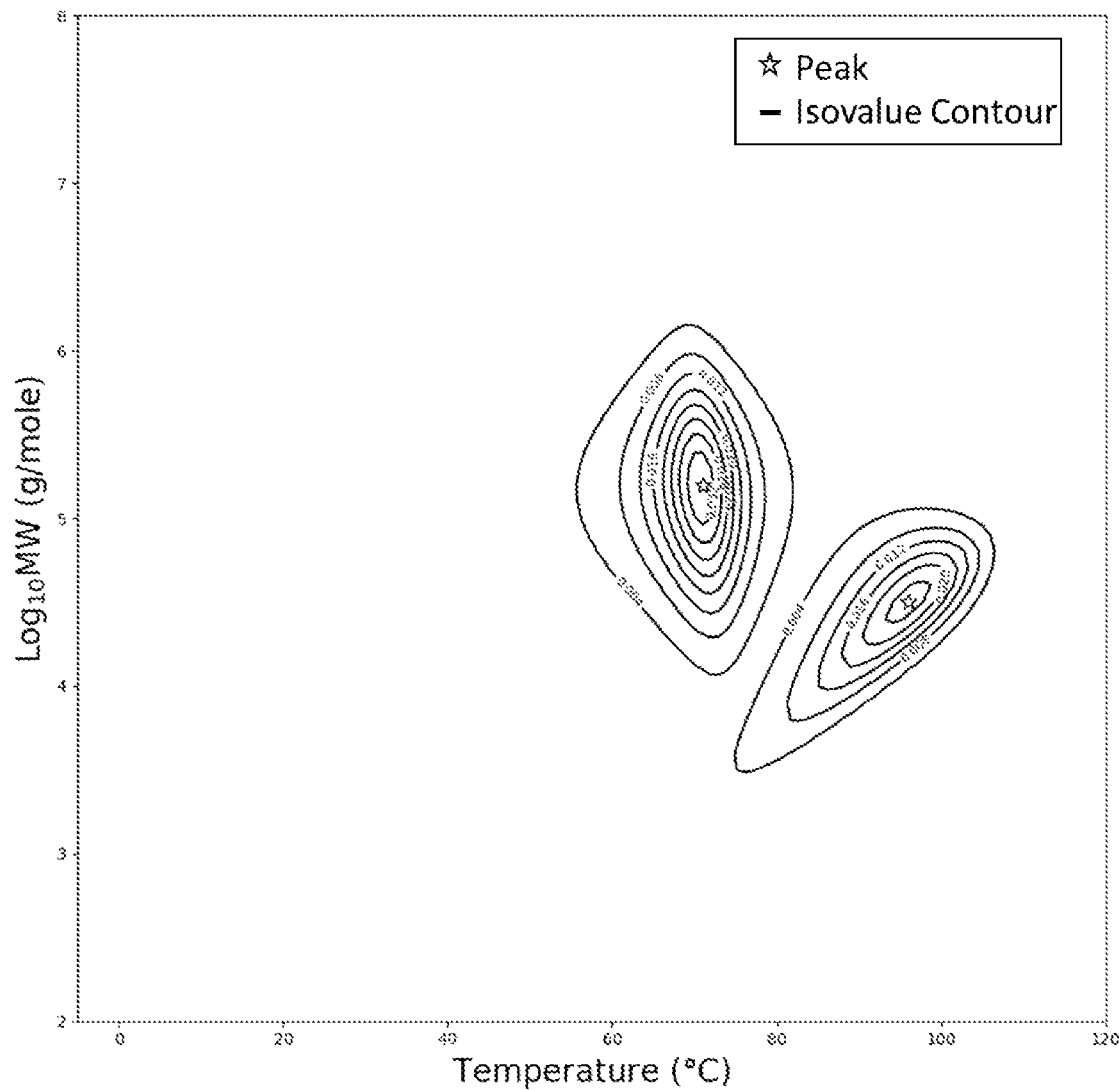
FIGS. 1 and 2 are the cross-fractionation chromatography (CFC) data for two polyethylenes described herein.

The present disclosure relates to polyethylene useful for films and in particular to films made from polyethylene having a broad orthogonal composition (or comonomer) distribution (BOCD).

Without being limited by theory, it is believed that the trade-offs in performance attributes described above can be significantly overcome by tailoring the molecular weight and comonomer distribution in the polyethylene product. The present invention includes a polyethylene produced from mixed-catalyst systems. More specifically, the mixed-catalyst system includes a rac-dimethylsilylbis(tetrahydroindenyl)zirconium dichloride catalyst and a zirconium co-catalyst that is a poor comonomer incorporator as compared to the rac-dimethylsilylbis(tetrahydroindenyl)zirconium dichloride catalyst. That is, the rac-dimethylsilylbis(tetrahydroindenyl)zirconium dichloride catalyst incorporates a comonomer into the polyethylene to a greater extent than the zirconium co-catalyst. Accordingly, the polyethylene population produced from the rac-dimethylsilylbis(tetrahydroindenyl)zirconium dichloride catalyst has a lower density than the polyethylene population produced from the zirconium co-catalyst. The resultant overall polyethylene product has a BOCD polyethylene product that has a combination of (1) a low weight average molecular weight (Mw) and high density population of polyethylene chains and (2) a high Mw and low density population of polyethylene chains, which achieves a combination of desirable performance attributes.

The lower density BOCD-type polyethylenes described herein is a polyethylene product that is multimodal in both molecular weight and short chain branching. This is accomplished using a combined catalyst system wherein a poor-comonomer incorporating catalyst is combined with a high-comonomer incorporating catalyst in a gas phase process to produce the multimodal polyethylene having the desired BOCD. Such polyethylenes are highly useful in forming films such as cast or blown films, especially blown films formed by melt extrusion of the polyethylene into a sheet or cylindrical/tubular form and exposed to positive air pressure against the forming film to expand the sheet in the transverse and machine directions (TD and MD), with or without some transverse direction (TD) tension, stretching the material before or during cooling. The inventive polyethylenes are also useful in extrusion coating applications.

As used herein, the term "film" refers to a continuous, flat, preferably flexible, polymeric structure having an average thickness within a range from 1 µm to 250 µm, alternatively 5 µm to 200 µm, alternatively 10 µm to 100 µm, or such a coating of similar thickness adhered to a flexible, non-flexible or otherwise solid structure. The "film" may comprise one layer, or multiple layers, each of which may comprise the inventive polyethylene. For example, one or more layers of a "film" may include a mixture of the polyethylene as well as a LDPE, another LLDPE, polypropylene homo- and copolymers, or a plastomer (e.g., a copolymer having a high content of comonomer polyethylene). Desirable uses for such films include labeling and packaging applications and stretch and cling films for wrapping around articles of commerce.

As used herein, when a polymer is referred to as comprising a monomer, the monomer is present in the polymer in the polymerized form of the monomer or in the derivative form of the monomer. The term "derived units" as used herein, refers to the polymerized form of the monomer from which the polymer was derived. For example, when a polymer is said to have an "ethylene" content of 95 wt % to 99.5 wt %, it is understood that the mer unit in the polymer is derived from ethylene in the polymerization reaction and said derived units are present at 95 wt % to 99.5 wt %, based upon the weight of the polymer.

Table 1 provides a listing of the test methods used for the various measurements described herein.

TABLE 1

| Test Name | Method or Description |
|---|---|
| Melt Index (L2) | ASTM D1238-13 at 2.16 kg and 190° C. |
| High Load Melt Index ($I_{21}$) | ASTM D1238-13 at 21.6 kg and 190° C. |
| Density | ASTM D1505-18, column density, samples were molded under ASTM D4703-10a, Procedure C, then conditioned under ASTM D618-08 (23° ± 2° C. and 50 ± 10% relative humidity) for 40 hours before testing. |
| Weight Average Molecular Weight (Mw) | 4D GPC (see below) |
| Number Average Molecular Weight (Mn) | 4D GPC (see below) |
| Z-Average Molecular Weight (Mz) | 4D GPC (see below) |
| 1% Secant Flexure Modulus | ASTM D882-18, 15 mm width strip |
| Yield Strength | ASTM D882-18, 15 mm width strip |
| Tensile Strength | ASTM D882-18, 15 mm width strip |
| Elongation at Break | ASTM D882-18, 15 mm width strip |
| Elongation at Yield | ASTM D882-18, 15 mm width strip |
| Dart Drop | ASTM D1709-16ael, Phenolic, Method A |
| Haze | ASTM D1003-13 |
| Gloss, 45° | ASTM D2457-13 |
| Elmendorf Tear | ASTM D1922-15 with conditioning for 40 hours at 23° C. + 2° C. and 50% + 10% relative humidity |
| Puncture | Modified ASTM D5748: ASTM probe was used with two 0.25 mil HDPE slip sheets. Machine Model: United SFM-1. Testing speed: 10 in/min |
| $^1$NMR | Unsaturations in a polymer were determined by $^1$H NMR with reference to 38 Macromolecules 6988 (2005), and 47 Macromolecules 3782 (2014) (see IH NMR description below) |
| Phase Angle at a Complex modulus G* | Small Angle Oscillatory Shear (SAOS) Rheology Test |
| Low Density Component | Cross-fractionation chromatography (CFC) (see description below) |

$^1$H NMR data was collected at 393K in a 10 mm probe using a Bruker spectrometer with a $^1$H frequency of at least 400 MHz (available from Agilent Technologies, Santa Clara, CA). Data was recorded using a maximum pulse width of 45° C., 5 seconds between pulses and signal averaging 512 transients. Spectral signals were integrated and the number of unsaturation types per 1,000 carbons was calculated by multiplying the different groups by 1,000 and dividing the result by the total number of carbons. The number average molecular weight (Mn) was calculated by dividing the total number of unsaturated species into 14,000, and has units of g/mol.

GPC 4D Procedure for Molecular Weight and Comonomer Composition Determination by GPC-IR Hyphenated with Multiple Detectors. Unless otherwise indicated, the distribution and the moments of molecular weight (Mw, Mn, Mw/Mn, etc.) and the comonomer content ($C_2$, $C_3$, $C_6$, etc.) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 g/mol to 10,000,000 g/mol. The MW at each elution volume is calculated with (3):

$$\log M = \frac{\log(K_{PS}/K)}{a+1} + \frac{a_{PS}+1}{a+1}\log M_{PS} \quad (3)$$

where the variables with subscript "PS" stand for polystyrene while those without a subscript are for the test samples. In this method, $\alpha_{PS}$=0.67 and $K_{PS}$=0.000175 while $\alpha$ and K are for other materials as calculated and published in literature (Sun, T. et al. (2001) *Macromolecules*, v. 34, pg. 6812), except that for purposes of this invention and claims thereto, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mol, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000TC) as a function of molecular weight. The short-chain branch (SCB) content per 1,000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2 = f * SCB/1000TC \quad (4)$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_2 \text{ signal within integration limits}}. \quad (5)$$

Then the same calibration of the $CH_3$ and $CH_2$ signal ratio, as mentioned previously in obtaining the $CH_3$/1000TC as a function of molecular weight, is applied to obtain the bulk $CH_3$/1000TC. A bulk methyl chain ends per 1,000TC (bulk $CH_3$ end/1000TC) is obtained by weight-averaging the chain-end correction over the molecular-weight range. Then, $$w2b = f * \text{bulk } CH_3/1000TC \quad (6)$$

$$\text{bulk SCB/1000TC} = \text{bulk } CH_3/1000TC - \text{bulk } CH_3 \text{ end}/1000TC \quad (7)$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c \quad (8)$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A} \quad (9)$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The reversed-co-monomer index (RCI,m) is computed from x2 (mol % co-monomer $C_3$, $C_4$, $C_6$, $C_8$, etc.), as a function of molecular weight, where x2 is obtained from the following expression in which n is the number of carbon atoms in the comonomer (3 for $C_3$, 4 for $C_4$, 6 for $C_6$, etc):

$$x2 = -\frac{200w2}{-100n - 2w2 + nw2}. \quad (11)$$

Then the molecular-weight distribution, W(z) where $z=\log_{10} M$, is modified to W'(z) by setting to 0 the points in W that are less than 5% of the maximum of W; this is to effectively remove points for which the S/N in the composition signal is low. Also, points of W' for molecular weights below 2000 g/mol are set to 0. Then W' is renormalized so that $$1=\int_{-\infty}^{\infty} W'dz. \quad (12)$$

and a modified weight-average molecular weight ($M_w'$) is calculated over the effectively reduced range of molecular weights as follows:

$$M_w'=\int_{-\infty}^{\infty} 10^z * W'dz. \quad (13)$$

The RCI,m is then computed as $$RCI,m=\int_{-\infty}^{\infty} x2(10^z-M_w')W'dz. \quad (14)$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^z - M_w')W'dz. \quad (15)$$

Note that in the above definite integrals the limits of integration are the widest possible for the sake of generality; however, in reality the function is only integrated over a finite range for which data is acquired, considering the function in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight (w2) comonomer signal, denoted as CDR-1,w, CDR-2,w, and CDR-3,w, as follows:

$$CDR-1, w = \frac{w2(Mz)}{w2(Mw)} \quad (16)$$

$$CDR-2, w = \frac{w2(Mz)}{w2\left(\frac{Mw+Mn}{2}\right)} \quad (17)$$

$$CDR-3, w = \frac{w2\left(\frac{Mz+Mw}{2}\right)}{w2\left(\frac{Mw+Mn}{2}\right)} \quad (18)$$

where w2(Mw) is the % weight co-monomer signal corresponding to a molecular weight of Mw, w2(Mz) is the % weight co-monomer signal corresponding to a molecular weight of Mz, w2[(Mw+Mn)/2)] is the % weight co-monomer signal corresponding to a molecular weight of (Mw+Mn)/2, and w2[(Mz+Mw)/2] is the % weight co-monomer signal corresponding to a molecular weight of Mz+Mw/2, where Mw is the weight-average molecular weight, Mn is the number-average molecular weight, and Mz is the z-average molecular weight.

Accordingly, the co-monomer distribution ratios can be also defined utilizing the % mole co-monomer signal, CDR-1,m, CDR-2,m, CDR-3,m, as $$CDR-1, m = \frac{x2(Mz)}{x2(Mw)} \quad (21)$$

$$CDR-2, m = \frac{x2(Mz)}{x2\left(\frac{Mw+Mn}{2}\right)} \quad (22)$$

$$CDR-3, w = \frac{x2\left(\frac{Mz+Mw}{2}\right)}{x2\left(\frac{Mw+Mn}{2}\right)} \quad (23)$$

where x2(Mw) is the % mole co-monomer signal corresponding to a molecular weight of Mw, x2(Mz) is the % mole co-monomer signal corresponding to a molecular weight of Mz, x2[(Mw+Mn)/2)] is the % mole co-monomer signal corresponding to a molecular weight of (Mw+Mn)/2, and x2[(Mz+Mw)/2] is the % mole co-monomer signal corresponding to a molecular weight of Mz+Mw/2, where Mw is the weight-average molecular weight, Mn is the number-average molecular weight, and Mz is the z-average molecular weight.

SAOS Rheology Test measures dynamic shear melt rheological data with an Advanced Rheometrics Expansion System (ARES) using parallel plates (diameter=25 mm) at 190° C. using a pristine compression molded sample at each temperature. The measurements were made over the angular frequency that ranged from 0.01 rad/s to 100 rad/s. Depending on the molecular weight and temperature, strains of 10% and 15% were used and linearity of the response was verified. A nitrogen stream was circulated through the sample oven to minimize chain extension or cross-linking during the experiments. All the samples were compression molded at 190° C. and no stabilizers were added. A sinusoidal shear strain is applied to the material. If the strain amplitude is sufficiently small, the material behaves linearly.

Cross-fractionation chromatography (CFC), which combines TREF and traditional GPC (TREF/GPC) as disclosed in WO 2015/123164 A1, was performed on a CFC-2 instrument from Polymer Char, Valencia, Spain on the bimodal polyethylenes. The instrument was operated and subsequent data processing, for example, smoothing parameters, setting baselines, and defining integration limits, was performed according to the manner described in the CFC User Manual provided with the instrument or in a manner commonly used in the art. The instrument was equipped with a TREF column (stainless steel; o.d., 3/8"; length, 15 cm; packing, non-porous stainless steel micro-balls) in the first dimension and a GPC column set (3 ×PLgel 10 µm Mixed B column from Polymer Labs, UK) in the second dimension. Downstream from the GPC column was an infrared detector (IR4 from Polymer Char) capable of generating an absorbance signal that is proportional to the concentration of polymer in solution.

The sample to be analyzed was dissolved in ortho-dichlorobenzene, at a concentration of about 5 mg/ml, by stirring at 150° C. for 75 minutes. Then a 0.5 ml volume of the solution containing 2.5 mg of polymer was loaded in the center of the TREF column and the column temperature was reduced and stabilized at about 120° C. for 30 minutes. The column was then cooled slowly (0.2° C./min) to 30° C. (for ambient runs) or −15° C. (for cryogenic runs) to crystallize the polymer on the inert support. The low temperature was held for 10 min before injecting the soluble fraction into the GPC column. All GPC analyses were done using solvent ortho-dichlorobenzene at 1 ml/min, a column temperature of 140° C., and in the "Overlap GPC Injections" mode. Then the subsequent higher-temperature fractions were analyzed by increasing the TREF column temperature to the fraction set-points in a stepwise manner, letting the polymer dissolve for 16 minutes ("Analysis Time"), and injecting the dissolved polymer into the GPC column for 3 minutes ("Elution Time"). The soluble portion or "purge" of the polymers was not analyzed, only the "insoluble" portion of the polymer samples were analyzed, that is, insoluble at −15° C. or lower.

The universal calibration method was used for determining the molecular mass of eluting polymers. Thirteen narrow molecular-weight distribution polystyrene standards (obtained from Polymer Labs, UK) within a range of 1.5 kg/mol to 8,200 kg/mol were used to generate a universal calibration curve. Mark-Houwink parameters were obtained from Appendix I of *Size Exclusion Chromatography* by S. Mori and H. G. Barth (Springer, 1999). For polystyrene K=1.38× $10^{-4}$ dl/g and α=0.7; and for polyethylene K=5.05×$10^{-4}$ dl/g and α=0.693 were used. Fractions having a weight % recovery (as reported by the instrument software) of less than 0.5% were not processed for calculations of molecular-weight averages (Mn, Mw, etc.) of the individual fractions or of aggregates of fractions.

Cryogenic cross-fractionation (CFC) is used here for determining both molecular weight distribution (MWD) and the short-chain branching distribution (SCBD) compositional information, which utilizes one or more temperature-gradient gel permeation chromatographic columns to compare the inventive polymers to competitive products on the market. The procedures for interpreting the data obtained from CFC are discussed in more detail below.

From the CFC data obtained, each fraction is listed by its fractionation temperature (Ti) along with its normalized weight percent (wt %) value, cumulative weight percent, and various moments of molecular weight averages (including weight average molecular weight, Mwi).

Figure 2:
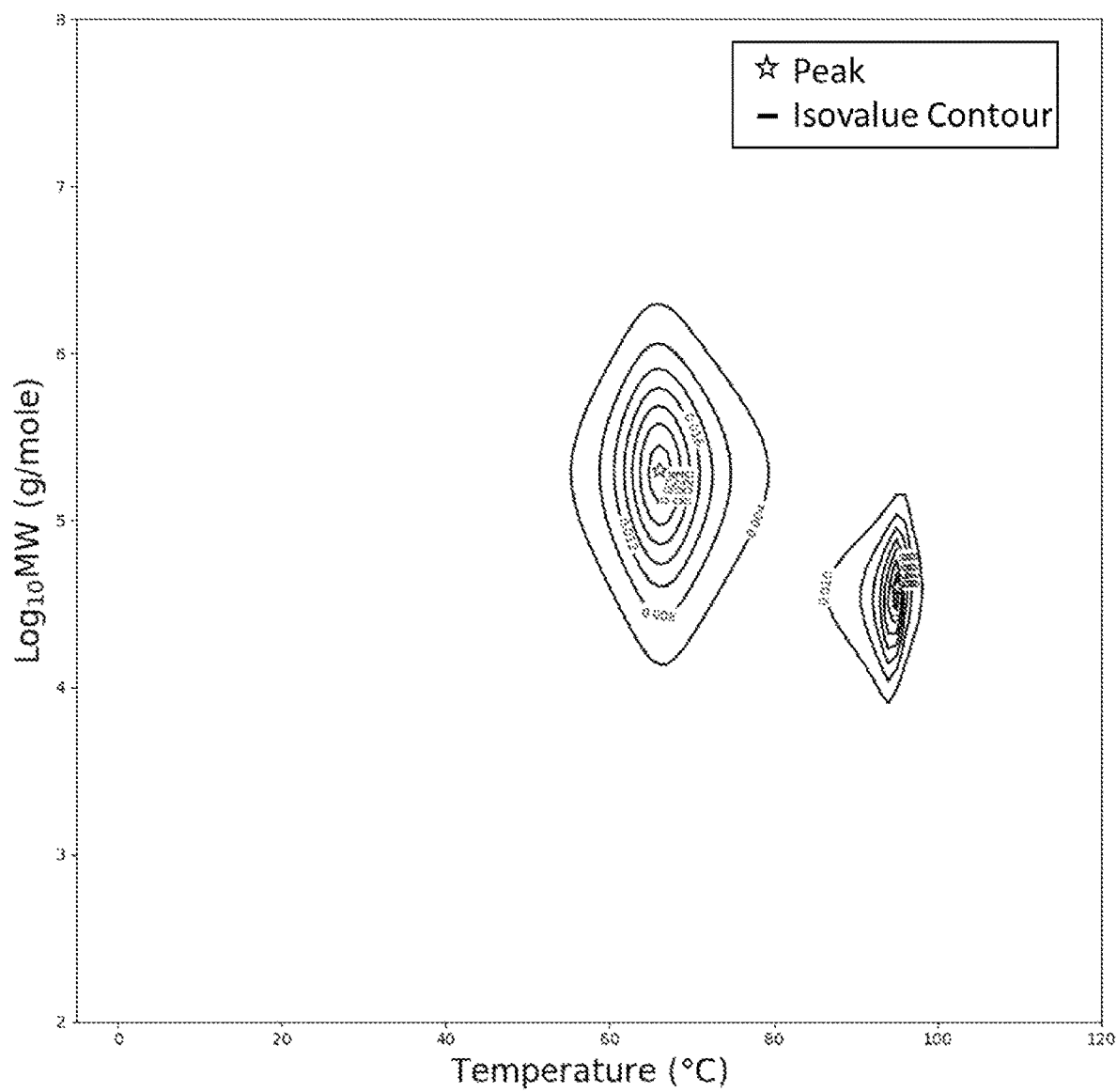
Figure 3:
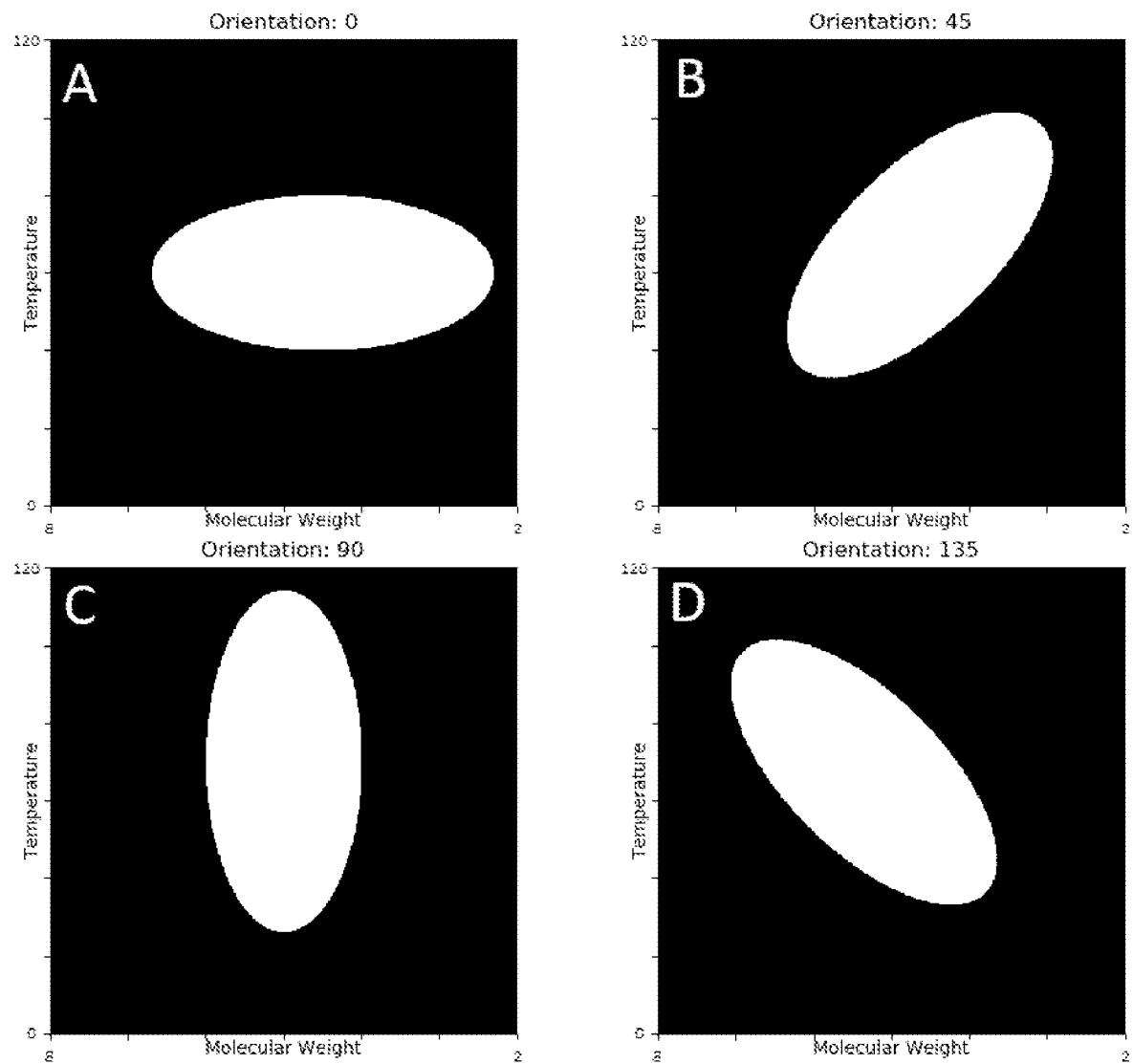
FIG. 3 shows orientation metrics that describe the direction in molecular space in which each single peak is pointing. A has an orientation of 0 (Also could be 180) and would be described as having a broad Molecular Weight Distribution (MWD) and a narrow Composition Distribution (CD). B has an orientation of 45 and would be described as Broad Orthogonal Composition Distribution. C has an orientation of 90 and would be described as narrow MWD and board CD. D has an orientation of 135 and would be described as Conventional. Although individual peaks can be pointing in different directions, the ensemble sample can have a completely different orientation as would be described by $M_{p1}$, $M_{p2}$, $T_{p1}$, and $T_{p2}$.

As shown in FIG. 1 and FIG. 2, two peaks are observed for both samples on the log 10MW vs. temperature contour plots. The peak located at lower temperature and higher molecular weight portion (corresponding to a low density population), is defined as Peak 1, with corresponding temperature and molecular weight coordinate of (Mp1, Tp1). And the peak located at higher temperature and lower molecular weight portion (corresponding to a high density population), is defined as Peak 2, with corresponding temperature and molecular weight coordinate of (Mp2, Tp2).

Quantitatively, the Moebus Bivariate Deconvolution with Rotation (MBDR) method was used to calculate the location of the two peaks and the relevant compositional information. The MBDR uses Equation 1 (Pearson IV x Pearson IV) and Equation 2 (Standard Minimization) to deconvolute peaks in x and y (or in this case temperature and molecular weight). One of the most important features of this method is the rotational term. Most samples vary in both dimensions simultaneously but standard deconvolution only truly allows variability in dimensions parallel to the axes (i.e., x or y not x and y). With this being the case, using standard deconvolution would require more peaks to be fitted to sufficiently characterize the data. The rotational term allows the strictly orthogonal dimensions to rotate therefore allowing the data to be more accurately characterized. By simultaneously fitting the parameters for two peaks with constraints, as shown in FIGS. 1 and 2, we can find the peak locations (e.g., molecular weight peak ($M_p$), temperature peak ($T_p$)), peak mass fractions (i.e., area under the plot for each of the two peaks), and shape parameters (e.g., theta, θ).

$$f(x,y) = \sum_{i=1}^{N} Amp_i \left\{1 + \left(\frac{x_{\theta i}}{\alpha_{xi}}\right)^2\right\}^{-m_{xi}} \exp\left\{-v_{xi}\arctan\left(\frac{x_{\theta i}}{\alpha_{xi}}\right)\right\} \left\{1 + \left(\frac{y_{\theta i}}{\alpha_{yi}}\right)^2\right\}^{-m_{yi}} \exp\left\{-v_{yi}\arctan\left(\frac{y_{\theta i}}{\alpha_{yi}}\right)\right\}$$

Equation 1 where $x_{\theta i} = (x - \lambda_{xi})\cos\theta_i - (y - \lambda_{yi})\sin\theta_i$ $y_{\theta i} = (x - \lambda_{xi})\sin\theta_i - (y - \lambda_{yi})\cos\theta_i$ $$\min\left[(M(x,y) - f(x,y))^2\right]$$

Equation 2 where M is the measured data or "ground truth".

Amp: the height (i.e. z value) of each peak.

λ: Location parameter. Indicates where on the axis the peak exists.

α: Scale parameter. Describes the width of the peak (as defined by Pearson IV).

m: Shape parameter. Describes the kurtosis, or "tailedness" of the peak.

v: Shape parameter. Describes skewness.

θ: Rotation parameter. Describes rotation from orthogonal axis.

Polyethylene

The polyethylene of the present invention can be a combination of (1) a low weight average molecular weight (Mw) and high density population of polyethylene chains and (2) a high Mw and low density population of polyethylene chains. Unless otherwise specified, the polyethylene of the present invention, the polyethylene of the present disclosure or other variants refers to the total product (i.e., combination of the two foregoing populations of polyethylene chains).

The polyethylene of the present disclosure comprises ethylene derived units and $C_3$-$C_{12}$ α-olefin derived units, where the $C_3$-$C_{12}$ α-olefin derived units are present at 0.5 wt % to 10 wt % of the polyethylene, alternatively at 2 wt % to 10 wt %, or alternatively at 5 wt % to 10 wt %. Preferred $C_3$-$C_{12}$ α-olefins include 1-butene, 1-hexene, and 1-octene.

The polyethylene of the present disclosure can have a density of 0.910 g/cm$^3$ to 0.930 g/cm$^3$, or alternatively 0.915 g/cm$^3$ to 0.925 g/cm$^3$.

The polyethylene of the present disclosure can have an $I_2$ value of 0.5 g/10 min to 2 g/10 min, or alternatively 0.7 g/10 min to 1 g/10 min.

The polyethylene of the present disclosure can have an $I_{21}$ value of 25 g/10 min to 75 g/10 min, or alternatively 30 g/10 min to 60 g/10 min.

The polyethylene of the present invention can have an $I_{21}/I_2$ ratio of 25 to 75, or alternatively 35 to 60.

The polyethylene of the present disclosure has an Mw of 95,000 g/mol to 125,000 g/mol, or alternatively 100,000 g/mol to 120,000 g/mol.

The polyethylene of the present disclosure has a number average molecular weight (Mn) of 10,000 g/mol to 25,000 g/mol, or alternatively 14,000 g/mol to 21,000 g/mol.

The polyethylene of the present disclosure has a Z-average molecular weight (Mz) of 200,000 g/mol to 500,000 g/mol, alternatively 200,000 g/mol to 350,000 g/mol, or alternatively 350,000 g/mol to 500,000 g/mol.

The polyethylene of the present disclosure has a Mw to Mn ratio of 4.0 to 9.0, or alternatively 5.0 to 8.0.

The polyethylene of the present disclosure has a Mz to Mn ratio of 8 to 30, or alternatively 10 to 27.

The polyethylene of the present disclosure has a molar reversed-co-monomer index (RCI,m) of 30 kg/mol to 150 kg/mol, alternatively 30 kg/mol to 100 kg/mol, or alternatively 75 kg/mol to 150 kg/mol.

The polyethylene of the present disclosure has a mole % comonomer distribution ratio (CDR2,m) of 1.0 to 2.0, or alternatively 1.0 to 1.6.

The polyethylene of the present disclosure may have a phase angle (at a complex modulus G* value of $1 \times 10^4$ Pa) equal or lower than 70°, or from 20° to 70°, preferably 20° to 63°, more preferably 35° to 63°.

The polyethylene of the present disclosure may have a $\theta_2$ range from 1.5 radians to −1.5 radians.

Process to Make Polyethylene

The polyethylenes of the present disclosure are synthesized using a mixed catalyst that comprises a rac-dimethylsilylbis(tetrahydroindenyl)zirconium dichloride catalyst according to Compound I and an zirconium co-catalyst that is a poor comonomer incorporator as compared to the rac-dimethylsilylbis(tetrahydroindenyl)zirconium dichloride catalyst (e.g., meso-1,1,3,3-tetramethyldisiloxy-1,3-bis-indenyl zirconium dichloride according to Compound II or (1-methyl indenylidine)(pentamethylcyclopentadienide) zirconium dimethyl Compound III). Other poor comonomer incorporators can be found in U.S. Pat. No. 6,828,394, which is incorporated herein by reference.

Compound I

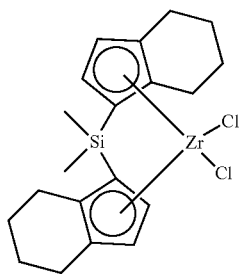

Compound II

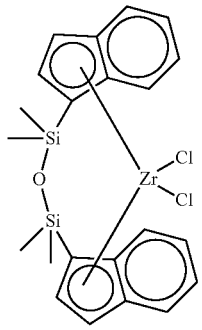

Compound III

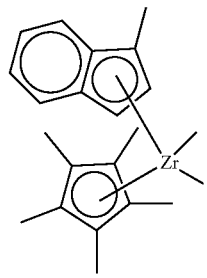

Generally, the rac-dimethylsilylbis(tetrahydroindenyl)zirconium dichloride catalyst and zirconium co-catalyst are mixed to form a homogeneous suspension of the catalysts, which are then deposited on an inert support. The mole ratio of the rac-dimethylsilylbis(tetrahydroindenyl)zirconium dichloride catalyst to the zirconium co-catalyst can be 50:50 to 90:10, or alternatively 55:45 to 85:15.

The mixed-catalyst system can be absent an activator. As used herein, the term "activator" refers to a compound capable of converting catalyst precursor into an active polymerization catalyst, and preferably includes alkyl alumoxane compounds (e.g., methylalumoxane) and/or tetra(perfluorinated aromatic)borates, but more preferably comprises tetra(perfluorinated aromatic)borates. Even more preferably, the activator comprises anions selected from tetra(pentafluorophenyl)borate, tetra(perfluorobiphenyl)borate, tetra(perfluoronaphthyl)borate, and combinations thereof.

The inert support preferably comprises silica, for example, amorphous silica, which may include a hydrated surface presenting hydroxyl or other groups that can be deprotonated to form reactive sites to anchor activators and/or catalyst precursors. Other porous support materials may optionally be present with the silica as a co-support, for example, talc, other inorganic oxides, zeolites, clays, organoclays, or any other organic or inorganic support material and the like, or mixtures thereof. Silicas that may be suitable are commercially available under the trade designations PD 14024 (PQ Corporation), D70-120A (Asahi Glass Co., Ltd. or AGC Chemicals Americas, Inc.), and the like.

The inert support is preferably dry, that is, free of absorbed water. Drying of the inert support may be effected by heating or calcining at 130° C. to 850° C., or alternatively 200° C. to 600° C., for a time of 1 minute to 100 hours, alternatively 12 hours to 72 hours, or alternatively 24 hours to 60 hours. The calcined support material may comprise at least some groups reactive with an organometallic compound, for example, reactive hydroxyl (OH) groups to produce the supported catalyst systems of this invention.

The polyethylene can be produced in any known process such as a slurry (in solution) process, such as in so-called "loop" reactors that are well known in the art, or in a gas phase reactor, especially a fluidized bed gas phase reactor wherein monomer and other gases are recirculated through a bed of polymer. The polyethylene is preferably produced in a gas phase process at a gas velocity of 1 ft/sec to 4 ft/sec, or alternatively 1 ft/sec to 2 ft/sec. Such processes are well known in the art and the process for making the polyethylene is not otherwise particularly limited.

The polyethylene of the present disclosure can be produced in a single-reactor process, wherein the monomers contact the catalysts in only one reactor to produce the polyethylene, or a dual-reactor process where the monomers contact the catalysts in two or more reactors in parallel or series, but most preferably a single-reactor process.

Processes for producing the polyethylene of the present disclosure generally include reacting ethylene, a $C_3$-$C_{12}$ α-olefin comonomer, and hydrogen in the presence of the mixed catalyst.

The reaction temperature for producing the polyethylene of the present disclosure can be 66° C. (150° F.) to 93° C. (200° F.), or alternatively 77° C. (170° F.) to 88° C. (190° F.).

The reactor pressure while producing the polyethylene of the present disclosure can be 200 psig to 400 psig, or alternatively 250 psig to 350 psig.

The mole % ratio of comonomer to ethylene in a reactor when producing the polyethylene of the present disclosure can be 0.005 to 0.030, or alternatively 0.005 to 0.020.

The ratio of ppm hydrogen to mole % ethylene in a reactor when producing the polyethylene of the present disclosure can be 3.0 to 20.0, or alternatively 4.0 to 15.0.

Polyethylene Films

The polyethylene of the present disclosure can be used for producing films. The film can be formed by any known process, but is preferably formed by "blowing" in a blown film process. The final film may be a single layer film comprising the polyethylene of the present disclosure as a blend with other polymers, especially other polyolefins, or consisting essentially of the polyethylene of the present disclosure and common additives such as antioxidants, fillers, etc. The film may also comprise two, three, four, five or more layers where any one or more of the layers may comprise or consist essentially of the polyethylene of the present disclosure. When a layer of the film comprises polyethylene of the present disclosure, it may be as a blend with other polyolefins such as low density polyethylene, linear low density polyethylene, high density polyethylene, polypropylene homopolymer, polypropylene copolymer, and combinations thereof.

In a typical process, the polyethylene melt is extruded through a die such as an annular slit die, usually vertically, to form a thin walled tube. Cooling, preferably in the form of positive air pressure, is introduced via a device in the center of the die to blow up the tube like a balloon. Cooling can also be effectuated or assisted by other means such as external (to the film) devices, and the air may be nitrogen/oxygen or other gases or mixtures of gases or liquids. For instance, mounted on top of the die, a high-speed air ring blows onto the exterior of the hot film to cool it. The cooling may occur at some adjustable distance from the die, which is typically at least 1 cm from the die from which the melt extrudes. The tube of film can then continue upwards or away from the die in a "machine direction" (MD), continually cooling, until it may pass through nip rolls where the tube is flattened to create what is known as a "lay-flat" tube of film. This lay-flat or collapsed tube can then be taken back down the extrusion "tower" via more rollers. On higher output lines, the air inside the bubble is also exchanged. This is known as IBC (Internal Bubble Cooling).

More particularly in the blown film process the ingredients used to form the film are added in any desirable form, preferably as granules, in a hopper which feeds the material to one or more extruders where the materials are melt blended at a desirable temperature through shear forces and/or heating. The molten material is then fed, with or without filtering, to a die, which is also heated to a desired temperature such as 180° C. to 220° C. and then forced from the die in a direction away from the die at least in part by force of blown air. The cooling of the forming film takes place as the film moves away from the die, and preferably a high-speed air ring that blows air that is at least 10° C., alternatively at least 20° C., cooler than the surrounding air facilitates that cooling. Preferably, the surrounding temperature in the area of the forming film is 20° C. to 60° C., alternatively 30° C. to 50° C. Most preferably, the forming film is cylindrical and the air ring forms a ring round the cooling tube that blows air concentrically around the film. The air preferably blows against the outside of the film, most preferably around the entire circumference formed by the film. The distance of the device from the die opening can be made to vary to allow a "relaxation time" for the hot film to gradually cool prior to being exposed to the cooling air from the cooling device. There is also air blown internally that both cools and blows the film up like a balloon. The film starts to expand where it eventually cools and crystallizes to form finished blow film where the finished film is eventually isolated by various means such as by rollers, nips, etc.

Then, the lay-flat film is either kept as such or the edges of the lay-flat are slit off to produce two flat film sheets and wound up onto reels. Articles such as bags can be made from such lay-flat films. In this regard, if kept as lay-flat, the tube of film is made into bags by sealing across the width of film and cutting or perforating to make each bag. This is performed either in line with the blown film process or at a later stage.

Preferably, the expansion ratio between the die and blown tube of film would be 1.5 times to 4 times the die diameter. The drawdown between the melt wall thickness and the cooled film thickness occurs in both radial and longitudinal directions and is easily controlled by changing the volume of air inside the bubble and by altering the haul off speed. This gives blown film a better balance of properties than traditional cast or extruded film that is drawn down along the extrusion direction only.

Preferably, the die used in the formation of the films herein is designed such that the die opening, through which the molten polyolefin extrudes, is in the form of a ring and the molten polyolefin emanating therefrom is in the form of a continuous tube. The Die Factor Rate at which the film is formed is within a range from 10 lb/in-hr (0.56 kg/mm-hr) to 40 lb/in-hr (2.25 kg/mm-hr), or alternatively 15 lb/in-hr (0.84 kg/mm-hr) to 26 lb/in-hr (1.46 kg/mm-hr); and preferably the Maximum Rate of extrusion is within a range from 350 lb/hr (159 kg/hr) to 500 lb/hr (227 kg/hr). Note that for the "Die Factor" there is one more difference besides the units. In the English unit, the die dimension is the die circumference, while in the metric unit, the die dimension is the die diameter.

A film comprising polyethylene of the present disclosure or consisting essentially of polyethylene of the present disclosure can have an average thickness within a range from 10 μm to 100 μm, alternatively 15 μm to 60 μm, or alternatively 15 μm to 40 μm.

A film comprising polyethylene of the present disclosure or consisting essentially of polyethylene of the present disclosure can have a 1% Secant flexure modulus in the machine direction (MD) of 25,000 psi to 45,000 psi, or alternatively 30,000 psi to 45,000 psi. Higher values for the 1% Secant flexure modulus in the machine direction indicate higher toughness in the film.

A film comprising polyethylene of the present disclosure or consisting essentially of polyethylene of the present disclosure can have a 1% Secant flexure modulus in the transverse direction (TD) (perpendicular to the MD within the plane of the film) of 30,000 psi to 60,000 psi, or alternatively 35,000 psi to 56,000 psi. Higher values for the 1% Secant flexure modulus in the transverse direction indicate higher toughness in the film.

A film comprising polyethylene of the present disclosure or consisting essentially of polyethylene of the present disclosure can have a tensile yield strength in the MD of 1,000 psi to 2,000 psi, or alternatively 1,250 psi to 1,750 psi.

A film comprising polyethylene of the present disclosure or consisting essentially of polyethylene of the present disclosure can have a tensile yield strength in the TD of 1,000 psi to 2,500 psi, or alternatively 1,500 psi to 2,500 psi.

A film comprising polyethylene of the present disclosure or consisting essentially of polyethylene of the present disclosure can have an elongation at yield in the MD of 5% to 12%, or alternatively 7% to 12%.

A film comprising polyethylene of the present disclosure or consisting essentially of polyethylene of the present disclosure can have an elongation at yield in the TD of 4% to 9%, or alternatively 5% to 9%.

A film comprising polyethylene of the present disclosure or consisting essentially of polyethylene of the present disclosure can have tensile strength in the MD of 5,000 psi to 10,000 psi, or alternatively 6,000 psi to 9,000 psi.

A film comprising polyethylene of the present disclosure or consisting essentially of polyethylene of the present disclosure can have tensile strength in the TD of 5,000 psi to 10,000 psi, or alternatively 6,000 psi to 9,000 psi.

A film comprising polyethylene of the present disclosure or consisting essentially of polyethylene of the present disclosure can have an elongation at break in the MD of 400% to 550%, or alternatively 450% to 550%.

A film comprising polyethylene of the present disclosure or consisting essentially of polyethylene of the present disclosure can have an elongation at break in the TD of 500% to 700%, or alternatively 550% to 700%.

A film comprising polyethylene of the present disclosure or consisting essentially of polyethylene of the present disclosure can have an Elmendorf tear in the MD of 40 g to 150 g, or alternatively 50 g to 125 g. Higher values for the Elmendorf tear in the machine direction indicate higher toughness in the film.

A film comprising polyethylene of the present disclosure or consisting essentially of polyethylene of the present disclosure can have an Elmendorf tear in the TD of 450 g to 625 g, or alternatively 500 g to 625 g. Higher values for the Elmendorf tear in the transverse direction indicate higher toughness in the film.

A film comprising polyethylene of the present disclosure or consisting essentially of polyethylene of the present disclosure can have a haze of 5% to 30%, or alternatively 10% to 25%.

A film comprising polyethylene of the present disclosure or consisting essentially of polyethylene of the present disclosure can have a gloss in the MD of 20% to 60%, or alternatively 25% to 50%.

A film comprising polyethylene of the present disclosure or consisting essentially of polyethylene of the present disclosure can have a gloss in the TD of 20% to 60%, or alternatively 25% to 50%.

A film comprising polyethylene of the present disclosure or consisting essentially of polyethylene of the present disclosure can have a Dart Drop value of 200 g/mil to 750 g/mil, or alternatively 300 g/mil to 600 g/mil.

A film comprising polyethylene of the present disclosure or consisting essentially of polyethylene of the present disclosure can have a seal initiation temperature at 1 N force of 100° C. to 120° C., or alternatively 100° C. to 110° C.

A film comprising polyethylene of the present disclosure or consisting essentially of polyethylene of the present disclosure can have a maximum hot tack force of 5 N to 20 N, preferably 10 N to 17 N.

When referring to a polyethylene or polyethylene film herein, in any embodiment when the phrase "consists essentially of" is used that means that the polyethylene, or film made of the polyethylene, includes less than 5 wt %, or 4 wt %, or 3 wt %, or 2 wt %, or 1 wt %, by weight of the polyethylene, of additives as are known in the art, such as fillers, colorants, antioxidants, anti-UV additives, curatives and cross-linking agents, aliphatic and/or cyclic containing oligomers or polymers, often referred to as hydrocarbon polyethylenes, and other additives well known in the art, and other common additives such as disclosed in WO 2009/007265.

Example Embodiments

A nonlimiting example embodiment of the present disclosure is a method comprising: reacting ethylene, a $C_3$ to $C_{12}$ α-olefin comonomer, and hydrogen in the presence of a mixed catalyst to form a polyethylene, wherein the polyethylene comprises: ethylene derived units and $C_3$ to $C_{12}$ α-olefin derived units at 0.5 wt % to 10 wt % of the polyethylene; wherein the polyethylene has: a density of 0.91 g/cm$^3$ to 0.93 g/cm$^3$, an $I_2$ value within a range from 0.5 g/10 min to 2 g/10 min, an $I_{21}$ value within a range from 25 g/10 min to 75 g/10 min, an $I_{21}/I_2$ ratio of 25 to 75, a molar reversed-co-monomer index (RCI,m) of 30 to 180, a phase angle equal or lower than 70° at complex modulus G* of 10,000 Pa, a $\theta_2$ within a range from 1.5 radians to −1.5 radians, and a low density population within a range from 50% and 70% by weight of the polyethylene; and wherein the mixed catalyst comprises rac-dimethylsilylbis(tetrahydroindenyl)zirconium dichloride (Compound I) and a zirconium co-catalyst (Compound II) in a Compound I to Compound II mole ratio of 50:50 to 90:10, and wherein the zirconium co-catalyst is a poor comonomer incorporator as compared to the rac-dimethylsilylbis(tetrahydroindenyl)zirconium dichloride catalyst. The reaction conditions can include one or more of the following: wherein a reaction temperature is 66° C. (150° F.) to 93° C. (200° F.); wherein a reactor pressure is 200 psig to 400 psig; wherein mole % ratio of comonomer to ethylene in a reactor is 0.005 to 0.030; and wherein a mole % ratio of hydrogen to ethylene in a reactor is 3.0 to 5.5.

Another nonlimiting example embodiment is a film comprising: polyethylene comprising ethylene derived units and $C_3$ to $C_{12}$ α-olefin derived units at 0.5 wt % to 10 wt % of the polyethylene; and having: a density of 0.91 g/cm$^3$ to 0.93 g/cm$^3$, an I2 value within a range from 0.5 g/10 min to 2 g/10 min, an $I_{21}$ value within a range from 25 g/10 min to 75 g/10 min, an $I_{21}/I_2$ ratio of 25 to 75, a molar reversed-comonomer index (RCI,m) of 30 to 180, a phase angle equal or lower than 70° at complex modulus G* of 10,000 Pa, a $\theta_2$ within a range from 1.5 radians to −1.5 radians, and a low density population within a range from 50% and 70% by weight of the polyethylene; wherein the film has a 1% Secant flexure modulus in a machine direction (MD) of 25,000 psi to 45,000 psi, an Elmendorf tear in the MD of 200 g to 350 g, and a Dart Drop value of 200 g/mil to 1,000 g/mil. The film may also have one or more of the following properties: wherein the film has a tensile yield strength in the MD of 1,000 psi to 2,000 psi; wherein the film has a 1% Secant flexure modulus in the TD of 30,000 psi to 60,000 psi; wherein the film has a tensile yield strength in the TD of 1,000 psi to 2,500 psi; wherein the film has an elongation at yield in the MD of 5% to 12%; wherein the film has a tensile strength in the MD of 5,000 psi to 10,000 psi; and wherein the film has an elongation at break in the MD of 400% to 550%.

Yet another nonlimiting example of the present disclosure is a composition comprising: polyethylene comprising ethylene derived units and $C_3$ to $C_{12}$ α-olefin derived units at 0.5 wt % to 10 wt % of the polyethylene; and having a density of 0.91 $g/cm^3$ to 0.93 $g/cm^3$, an $I_2$ value within a range from 0.5 g/10 min to 2 g/10 min, an $I_{21}$ value within a range from 25 g/10 min to 75 g/10 min, an $I_{21}/I_2$ ratio of 25 to 75, a molar reversed-co-monomer index (RCI,m) of 30 to 180, a phase angle equal or lower than 70° at complex modulus G* of 10,000 Pa, a $\theta_2$ within a range from 1.5 radians to −1.5 radians, and a low density population within a range from 50% and 70% by weight of the polyethylene.

Optionally, any of the foregoing nonlimiting examples may further include one or more of the following: Element 1: wherein the polyethylene has a weight average molecular weight (Mw) of 95,000 g/mol to 125,000 g/mol; Element 2: wherein the polyethylene has a number average molecular weight (Mn) of 10,000 g/mol to 25,000 g/mol; Element 3: wherein the polyethylene has a Z-average molecular weight (Mz) of 200,000 g/mol to 500,000 g/mol; Element 4: wherein the polyethylene has a Mw to Mn ratio of 4.0 to 9.0; Element 5: wherein the polyethylene has a Mz to Mn ratio of 8 to 30; and Element 6: wherein the polyethylene has a mole % comonomer distribution ratio (CDR2,m) of 1.0 to 2.0. Examples of combinations include, but are not limited to, Element 1 in combination with one or more of Elements 2-6; Element 2 in combination with one or more of Elements 3-6; Element 3 in combination with one or more of Elements 4-6; Element 4 in combination with one or more of Elements 5-6; and Elements 5 and 6 in combination.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Mixed Catalyst 1—weight ratio 80:20 rac-dimethylsilylbis(tetrahydroindenyl) zirconium dichloride (Compound I) to meso-1,1,3,3-tetramethyldisiloxy-1,3-bisindenyl zirconium dichloride (Compound II).

To a stirred vessel 1,400 g of toluene was added along with 925 g of methylaluminoxane (30 wt % in toluene). To this solution 734 g of ES70-875° C. calcined silica was added. The mixture was then stirred for three hours at 100° C. after which the temperature was reduced and the reaction was allowed to cool to ambient temperature. Rac-dimethylsilylbis(tetrahydroindenyl)zirconium dichloride (14.62 g, 32.00 mmol) and meso-1,1,3,3-tetramethyldisiloxy-1,3-bisindenyl zirconium dichloride (4.18 g, 8.00 mmol) were then dissolved in toluene (250 g) and added to the vessel, which was stirred for two more hours. The mixing speed was then reduced and stirred slowly while drying under vacuum for 60 hours, after which 1,012 g of light yellow silica was obtained.

Mixed Catalyst 2—60:40 weight ratio rac-dimethylsilylbis(tetrahydroindenyl) zirconium dichloride (Compound I) to meso-1,1,3,3-tetramethyldisiloxy-1,3-bisindenyl zirconium dichloride (Compound II).

To a stirred vessel 1,400 g of toluene was added along with 925 g of methylaluminoxane (30 wt % in toluene). To this solution 734 g of ES70-875° C. calcined silica was added. The mixture was then stirred for three hours at 100° C. after which the temperature was reduced and the reaction was allowed to cool to ambient temperature. Rac-dimethylsilylbis(tetrahydroindenyl)zirconium dichloride (10.96 g, 24.00 mmol) and meso-1,1,3,3-tetramethyldisiloxy-1,3-bisindenyl zirconium dichloride (8.36 g, 16.0 mmol) were then dissolved in toluene (250 g) and added to the vessel, which was stirred for two more hours. The mixing speed was then reduced and stirred slowly while drying under vacuum for 60 hours, after which 1,041 g of light yellow silica was obtained.

Mixed Catalyst 3—80:20 weight ratio of rac-dimethylsilylbis(tetrahydroindenyl) zirconium dichloride (Compound I) to (1-methyl indenylidine) (pentamethylcyclopentadienide) zirconium dimethyl (Compound III).

To a stirred vessel 1,400 g of toluene was added along with 925 g of methylaluminoxane (30 wt % in toluene). To this solution 734 g of ES70-875° C. calcined silica was added. The mixture was then stirred for three hours at 100° C. after which the temperature was reduced and the reaction was allowed to cool to ambient temperature. Rac-dimethylsilylbis(tetrahydroindenyl)zirconium dichloride (14.62 g, 32.00 mmol) and (1-methyl indenylidine)(pentamethylcyclopentadienide) zirconium dimethyl (3.09 μg, 8.00 mmol) were then dissolved in toluene (250 g) and added to the vessel, which was stirred for two more hours. The mixing speed was then reduced and stirred slowly while drying under vacuum for 60 hours, after which 1,011 g of light yellow silica was obtained.

Polymerization was performed in an 18.5 foot tall gas-phase fluidized bed reactor with a 10 foot body and an 8.5 foot expanded section. Cycle and feed gases were fed into the reactor body through a perforated distributor plate, and the reactor was controlled at 300 psi and 64 mol % ethylene.

The reactor temperature was maintained at 85° C. (185° F.) throughout the polymerization by controlling the temperature of the cycle gas loop. The catalyst was delivered in a mineral oil slurry containing 20 wt % supported catalyst. As a control, rac-dimethylsilylbis(tetrahydroindenyl) zirconium dichloride (Compound I) on the same support as above was used as a catalyst as the Comparative Single Catalyst. Table 2 provides the processing conditions for producing polyethylene.

TABLE 2

| Sample | MC1 | MC2 | MC3 |
|---|---|---|---|
| Catalyst System | Mixed Catalyst 1 | Mixed Catalyst 2 | Mixed Catalyst 3 |
| Hydrogen conc, (molppm) | 760 | 511 | 329 |
| Hydrogen flow (mlb/hr) | 10.51 | 8.07 | 4.74 |
| $C_6/C_2$ Ratio (mol %/mol %) | 0.010 | 0.014 | 0.017 |
| Comonomer conc. (mol %) | 0.61 | 0.87 | 1.08 |
| $C_2$ conc. (mol %) | 63.8 | 64.0 | 64.0 |
| Comonomer/$C_2$ Flow Ratio | 0.079 | 0.083 | 0.095 |
| $C_2$ flow (lb/hr) | 96 | 70 | 81 |
| $H_2/C_2$ Ratio (ppm/mol %) | 11.9 | 8.0 | 5.1 |
| Rx. Pressure SP (psig) | 300 | 300 | 300 |
| Reactor Temp SP (F) | 175 | 185 | 185 |
| Avg. Bedweight (lb) | 368 | 343 | 325 |
| Production (lb/hr) | 74 | 44 | 61 |
| Residence Time (hr) | 5.0 | 7.8 | 5.3 |
| $C_2$ Utilization (lb$C_2$/lb$C_2$ poly) | 1.29 | 1.60 | 1.33 |
| Avg. Velocity (ft/s) | 2.25 | 2.25 | 2.25 |
| Catalyst Slurry Feed (cc/hr) or Secs/Shot | 31.2 | 27.5 | 41.3 |
| Catalyst Slurry Conc. (wt. frac.) | 0.2 | 0.2 | 0.2 |
| Catalyst Slurry Density (g/ml) | 0.94 | 0.94 | 0.94 |
| Catalyst Feed (g/hr) | 5.893 | 5.193 | 7.803 |
| Cat Activity (g poly/g cat) | 5196 | 3852 | 3555 |

Tables 3 and 4 provide the polyethylene product properties.

TABLE 3

| Sample | MC1 | MC2 | MC3 |
|---|---|---|---|
| $I_2$ (g/10 min) | 0.59 | 0.80 | 1.11 |
| $I_{21}$ (g/10 min) | 23.30 | 46.98 | 59.78 |
| $I_{21}/I_2$ | 39.67 | 58.40 | 53.69 |
| Density (g/cm$^3$) | 0.9198 | 0.9228 | 0.9231 |

TABLE 4

| Sample | MC1 | MC2 | MC3 | Comparitive 16-74 |
|---|---|---|---|---|
| $I_2$ (g/10 min) | 0.59 | 0.80 | 1.11 | 0.93 |
| $I_{21}/I_2$ | 40 | 58 | 54 | 53 |
| Mw (g/mol) | 103398 | 114526 | 128208 | 128411 |
| Mn (g/mol) | 15128 | 12513 | 14594 | 11575 |
| Mz (g/mol) | 212614 | 400650 | 509871 | 417994 |
| Mz/Mn | 14.0 | 32.0 | 34.9 | 36.1 |
| Mw/Mn | 6.83 | 9.15 | 8.78 | 11.09 |
| Mz/Mw | 2.05 | 3.50 | 3.98 | 3.25 |
| Hexene Content (wt %) | 8.07 | 8.35 | 8.83 | 9.50 |
| RCI,m (kg/mol) | 36.6 | 100.3 | 161 | 310.9 |

TABLE 4-continued

| Sample | MC1 | MC2 | MC3 | Comparitive 16-74 |
|---|---|---|---|---|
| CDR2,m | 1.09 | 1.33 | 1.50 | 2.38 |
| Phase angle at G* = 10,000 Pa | 59 | 53 | 54 | 70 |

In each case, adding the meso-1,1,3,3-tetramethyldisiloxy-1,3-bisindenyl zirconium reduced the overall incorporation ability of the system, as shown by the increased hexene requirement to make the same density product. The reduced hydrogen requirements also show the reduced molecular weight capability of meso-1,1,3,3-tetramethyldisiloxy-1,3-bisindenyl zirconium compared to rac-dimethylsilylbis(tetrahydroindenyl)zirconium. Therefore, introducing meso-1,1,3,3-tetramethyldisiloxy-1,3-bisindenyl zirconium into the system contributes a low molecular weight, high density component. At similar temperatures of 87° C. (188° F.) and 85° C. (185° F.), the $I_{21}/I_2$ increases when this component is added to the system. Increasing the meso-1,1,3,3-tetramethyldisiloxy-1,3-bisindenyl zirconium catalyst loading from 20 mol % to 40 mol % further increases this $I_{21}/I_2$ shift due to a larger low molecular weight, high density component. Similarly, more hexene and less hydrogen are required to meet target specs. When the temperature is lowered at the 80:20 ratio to 79° C. (175° F.), the $I_{21}/I_2$ adjusts to a similar value indicating a probably shift in molecular weight distribution that may lead to more favorable film properties.

Changing the cocatalyst to (1-methyl indenylidine) (pentamethylcyclopentadienide) zirconium further increases the disparity in molecular weight and density between the two components in the system. Hydrogen requirements are lower and hexene requirements were higher than all rac-dimethylsilylbis(tetrahydroindenyl)zirconium dichloride: meso-1,1,3,3-tetramethyldisiloxy-1,3-bisindenyl zirconium dichloride systems tested. At an 80:20 catalyst ratio, the (1-methyl indenylidine)(pentamethylcyclopentadienide) zirconium system also shows a higher $I_{21}/I_2$ than the meso-1,1,3,3-tetramethyldisiloxy-1,3-bisindenyl zirconium dichloride system. This difference is likely due to a larger molecular weight split between the two components.

FIGS. 1 and 2 are the CFC data for MC2 and MC3. Table 5 is molecular weight data determined using the MBDR method to deconvolution FIGS. 1 and 2. In Table 5, Cumulative Wt %$_{transition}$ is defined as the averaged cumulative wt %, i.e. the location of saddle line, which separates the two population contours. Orientation$_{p1}$ denotes the orientation of the low density peak, and Orientation$_{p2}$ denotes the orientation of the high density peak. And positive Orientation values indicate the composition distribution of the peak is BOCD, and negative Orientation values indicate the composition distribution of the peak is BCD. Orientation values close to 0 or 180 indicate narrow composition distribution and broad MW distribution, while orientations of around 90 indicate narrow MW distribution and broad composition distribution. Comparative CFC data was taken from PE resin made as described in US 2019-0144576.

TABLE 5

| Samples | MC2(1.09) | MC3(1.08) | Comparative 113-17,16-74 |
|---|---|---|---|
| CumulativeWt % transition (%) | 63.41 | 55.01 | 30.88 |
| $M_{p1}$ (g/mol) | 125890 | 199530 | 251190 |

TABLE 5-continued

| Samples | MC2(1.09) | MC3(1.08) | Comparative 113-17,16-74 |
|---|---|---|---|
| $M_{P2}$ (g/mol) | 31623 | 39811 | 31623 |
| $T_{P1}$ (° C.) | 71.00 | 66.0 | 56.00 |
| $T_{P2}$ (° C.) | 95.00 | 95.0 | 91.00 |
| $T_{P1}$-$T_{p2}$ (° C.) | −24.00 | −29.0 | −35.00 |
| $M_{p1}/M_{P2}$ | 3.98096 | 5.012 | 219567 |
| Orientation$_{p1}$ | 5.78 | 0.14 | 76.38 |
| Orientation$_{P2}$ | 134.16 | 176.32 | 149.22 |

Blown films were extruded on a 2.5 inch Battenfield Gloucester Line (30:1 L:D) equipped with a 6 inch oscillating die. Output rate was 188 lb/hr (10 lb/hr/in die circumference) and the die gap was 60 mil. The target film gauge was 1 mil and the blow up ratio was held constant at 2.5. FLH was typically 19-24 inch. A standard "hump" temperature profile was used where "BZ" is barrel zone: BZ1=310/BZ2=410/BZ3=380/BZ4=350/BZ5=350/Adapter=390/Die=390F.

TABLE 6

| Sample ID | MC1 | MC2 | MC3 |
|---|---|---|---|
| Resin Density (g/mL) | 0.9198 | 0.9228 | 0.9231 |
| Resin $I_2$ (g/10 min) | 0.59 | 0.8 | 1.11 |
| Resin $I_{21}$ (g/10 min) | 23.3 | 46.98 | 59.78 |
| Resin $I_{21}/I_2$ ratio | 39.67 | 58.40 | 53.69 |
| Gauge (mil) | 0.98 | 1.03 | 1 |
| Die Gap (mil) | 60 | 60 | 60 |
| Blow up ratio | 2.5 | 2.5 | 2.5 |
| Air % | 89.8 | 82.6 | 71.6 |
| TC (Top Cone) (in) | 0.375 | 0.375 | 0.375 |
| TL (Top Lip) (in) | 0.75 | 0.75 | 0.75 |
| BL (Bottom Lip) (in) | 0.625 | 0.625 | 0.625 |
| FLH (Freeze line height) (in) | 17 | 20 | 21 |
| Output (lb/hr) | 188 | 188 | 188 |
| Screw Speed (rpm) | 61.3 | 63.2 | 62.2 |
| Melt Pressure1 (psi) | 3630 | 2810 | 2450 |
| Melt Pressure2 (psi) | 2510 | 2050 | 1740 |
| %MotorLoad | 54 | 44.1 | 40.9 |
| HP | 18 | 15 | 13 |
| Melt Temp (° F.) | 396 | 389 | 386 |
| Die Factor (lb/hr/in) | 9.95 | 9.95 | 9.98 |
| Bubble Pressure (in of water) | 7 | 6.05 | 5 |
| Draw Speed (ft/min) | 166.5 | 166.3 | 166.3 |
| Die Diameter (in) | 6 | 6 | 6 |
| Velocity @ Die Exit, Vo (cm/s) | 4.22 | 4.22 | 4.22 |
| Velocity @ FLH, Vf (cm/s) | 86.56 | 82.09 | 84.52 |
| DDR | 20.50 | 19.44 | 20.02 |
| MD Strain rate ($s^{-1}$) | 1.91 | 1.53 | 1.51 |
| Draw Down Ratio | 20.50 | 19.44 | 20.02 |
| Specific Output(lb/hr/rpm) | 3.05 | 2.96 | 3.02 |
| Specific Energy output (W/lb/hr) | 71.33 | 59.44 | 51.52 |

Further process data is found in Table 6, which includes film properties at 1.0 mil gauge. TDA is the total defect area, which is a measure of defects in a film specimen and is reported as the accumulated area of defects in square millimeters (mm2) normalized by the area of film in square meters (m2) examined, thus having a unit of (mm2/m2) or "ppm". Only defects with a dimension above 200 microns are reported in Table 6. TDA is obtained by an Optical Control System (OCS). This system includes a small extruder (ME20 2800), cast film die, chill roll unit (Model CR-9), a winding system with good film tension control, and an online camera system (Model FSA-100) to examine the cast film generated for optical defects. The typical testing condition for the cast film generation includes an extruder zone temperature setting of 154-210° C.; a feed throat/Zone 1/Zone 2/Zone3/Zone4/Die of 70/190/200/210/215/215; an extruder speed of 50 rpm; a chill roll temperature of 30° C.; and a chill roll speed of 3.5 m/min. The system generates a cast film of about 4.9 inch in width and a nominal gauge of 2 mil. Melt temperature varies with materials, and is typically around 215° C. ESO is the energy specific extrusion output (lb/hr) in film extrusion normalized by the extruder power (hp) consumption and is a measure of a material's processability.

Table 7 provides the properties of the films.

TABLE 7

| Sample | MC1 | MC2 | MC3 |
|---|---|---|---|
| $I_2$ (g/10 min) | 0.59 | 0.80 | 1.11 |
| $I_{21}$ (g/10 min) | 23.30 | 46.98 | 59.78 |
| $I_{21}/I_2$ | 39.67 | 58.40 | 53.69 |
| Density (g/cm³) | 0.9198 | 0.9228 | 0.9231 |
| Average Gauge (mils) | 1.02 | 1.02 | 1.15 |
| 1% Secant (psi) | | | |
| MD | 31156 | 41000 | 35563 |
| TD | 37570 | 55249 | 50444 |
| Yield Strength (psi) | | | |
| MD | 1,460 | 1658 | 1598 |
| TD | 1,570 | 2004 | 1883 |
| Tensile Strength (psi) | | | |
| MD | 8927 | 7123 | 6460 |
| TD | 8057 | 6834 | 6228 |
| Elmendorf Tear | | | |
| MD(g) | 109 | 50.7 | 50.1 |
| TD (g) | 589 | 588.3 | 528.5 |
| MD (g/mil) | 108 | 47 | 45 |
| TD (g/mil) | 584 | 571 | 480 |
| Haze | | | |
| Haze (%) | | 19 | 23.9 |
| Haze- internal (%) | 2.9 | 3.06 | 3.19 |
| Gloss | | | |
| MD | 46.6 | 29.9 | 24.2 |
| TD | 48.7 | 32.1 | 25.5 |
| Dart Drop (Method A) | | | |
| (g) | 554 | 344 | 323 |
| (g/mil) | 543 | 337 | 281 |
| Puncture (Btec probe, B) | | | |
| Break Energy (in-lbs/mil) | 18.38 | 17.34 | 26.75 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" 15 or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A composition comprising:
polyethylene comprising ethylene derived units and $C_3$ to $C_{12}$ α-olefin derived units at 0.5 wt % to 10 wt % of the polyethylene; and having a density of 0.91 g/cm$^3$ to 0.93 g/cm$^3$, an $I_2$ value within a range from 0.5 g/10 min to 2 g/10 min, an $I_{21}$ value within a range from 25 g/10 min to 75 g/10 min, an $I_{21}/I_2$ ratio of 25 to 75, a molar reversed-co-monomer index (RCI,m) of 30 to 180, a phase angle equal or lower than 70° at complex modulus G* of 10,000 Pa, a $\theta_2$ within a range from 1.5 radians to –1.5 radians, and a low density population within a range from 50% and 70% by weight of the polyethylene.

2. A film comprising:
polyethylene comprising ethylene derived units and $C_3$ to $C_{12}$ α-olefin derived units at 0.5 wt % to 10 wt % of the polyethylene; and having:
a density of 0.91 g/cm$^3$ to 0.93 g/cm$^3$,
an $I_2$ value within a range from 0.5 g/10 min to 2 g/10 min,
an $I_{21}$ value within a range from 25 g/10 min to 75 g/10 min,
an $I_{21}/I_2$ ratio of 25 to 75,
a molar reversed-co-monomer index (RCI,m) of 30 to 180,
a phase angle equal or lower than 70° at complex modulus G* of 10,000 Pa,
a $\theta_2$ within a range from 1.5 radians to –1.5 radians, and
a low density population within a range from 50% and 70% by weight of the polyethylene; and
wherein the film has a 1% secant flexural modulus in a machine direction (MD) of 25,000 psi to 45,000 psi, an Elmendorf tear in the MD of 200 g to 350 g, and a dart drop value of 200 g/mil to 1,000 g/mil.

3. The film of claim 2, wherein the film has one or more of the following properties:
(A) a tensile yield strength in the MD of 1,000 psi to 2,000 psi;
(B) a 1% secant flexural modulus in the TD of 30,000 psi to 60,000 psi;
(C) a tensile yield strength in the TD of 1,000 psi to 2,500 psi;
(D) an elongation at yield in the MD of 5% to 12%;
(E) a tensile strength in the MD of 5,000 psi to 10,000 psi; and
(F) an elongation at break in the MD of 400% to 550%.

4. The film of claim 3, having all of the properties (A)-(F).

5. A method comprising: reacting ethylene, a $C_3$ to $C_{12}$ α-olefin comonomer, and hydrogen in the presence of a mixed catalyst to form a polyethylene, wherein the polyethylene comprises: ethylene derived units and $C_3$ to $C_{12}$ α-olefin derived units at 0.5 wt % to 10 wt % of the polyethylene; wherein the polyethylene has:
a density of 0.91 g/cm$^3$ to 0.93 g/cm$^3$,
an $I_2$ value within a range from 0.5 g/10 min to 2 g/10 min,
an $I_{21}$ value within a range from 25 g/10 min to 75 g/10 min,
an $I_{21}/I_2$ ratio of 25 to 75,
a molar reversed-co-monomer index (RCI,m) of 30 to 180,
a phase angle equal to or lower than 70° at complex modulus G* of 10,000 Pa,
a $\theta_2$ within a range from 1.5 radians to –1.5 radians, and
a low density population within a range from 50% and 70% by weight of the polyethylene; and
wherein the mixed catalyst comprises rac-dimethylsilyl-bis(tetrahydroindenyl)zirconium dichloride (Compound I) and a zirconium co-catalyst (Compound II) in a Compound I to Compound II mole ratio of 50:50 to 90:10, and wherein the zirconium co-catalyst is a poor comonomer incorporator as compared with rac-dimethylsilylbis(tetrahydroindenyl)zirconium dichloride.

6. The method of claim 5, wherein the reacting takes place at a temperature of 66° C. (150° F.) to 93° C. (200° F.) and/or at a pressure of 200 psig to 400 psig.

7. The method of claim 6, wherein the reacting takes place in a reactor in which mole % ratio of comonomer to ethylene is 0.005 to 0.030 and/or ratio of hydrogen to ethylene (ppm/mol %) is 3.0 to 5.5.

8. The method of claim 5, wherein the polyethylene has one or more of the following properties:
(a) a weight average molecular weight (Mw) of 95,000 g/mol to 125,000 g/mol;
(b) a number average molecular weight (Mn) of 10,000 g/mol to 25,000 g/mol;
(c) a Z-average molecular weight (Mz) of 200,000 g/mol to 500,000 g/mol;
(d) a Mw to Ma ratio of 4.0 to 9.0;
(e) a Mz to Mn ratio of 8 to 30; and
(f) a mole % comonomer distribution ratio (CDR2,m) of 1.0 to 2.0.

9. The method of claim 8, wherein the polyethylene has all of the properties (a)-(f).

10. The method of claim 5 further comprising forming a film with a compound comprising the polyethylene.

* * * * *